Feb. 16, 1937. P. E. NOLAN 2,071,138
FEED COLLET
Filed July 19, 1935
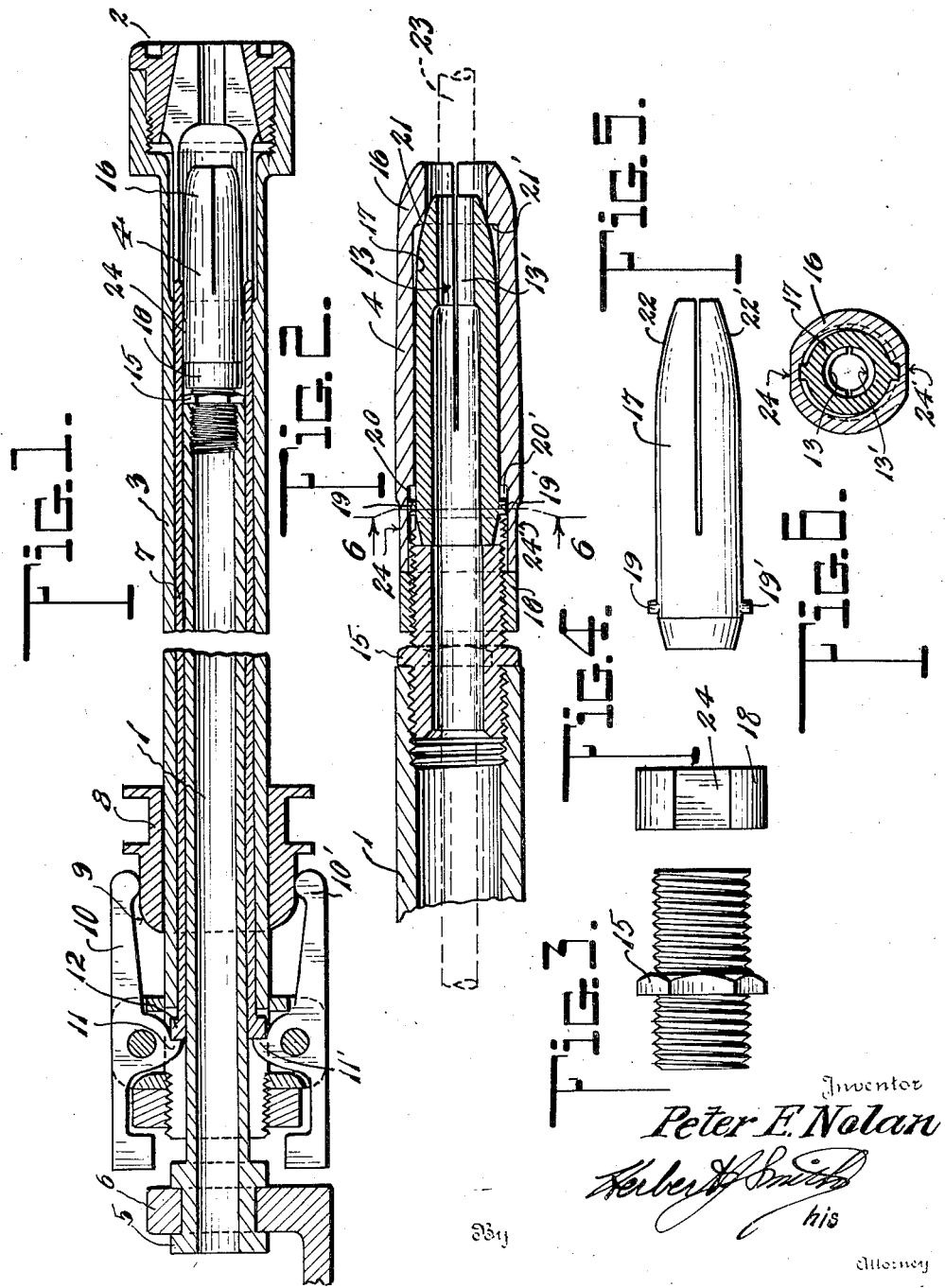
Inventor
Peter F. Nolan
By Herbert H. Smith
his Attorney Patented Feb. 16, 1937

2,071,138

UNITED STATES PATENT OFFICE 2,071,138

FEED COLLET

Peter E. Nolan, Providence, R. I.

Application July 19, 1935, Serial No. 32,272

2 Claims. (Cl. 29—62)

My invention relates to new and useful improvements in a mechanism that is particularly adapted for attachment to a feed quill or sleeve of machines such as automatic screw machines, automatic lathes, or other metal working machines, an object thereof being to provide an improved feed collet with a stock gripping pad that may be readily adjusted when slightly worn, and quickly replaced when necessary.

Another object of my invention is to provide a feed collet having an adjustable metallic pad member for contacting the surface of the bar stock, and an outer resilient shell, commonly called a cone, for said pad member to afford a nicety of pressure of the pad upon the bar stock.

A further object is to provide a pad for the collet, the pad being of such simplicity in external design that any one of a multiplicity of pads having various internal stock gripping surfaces of different cross sectional shapes may be used with the same shell or cone.

In automatic screw machines, and automatic lathes, referred to above, the bar stock is gripped by a feed finger or collet which automatically advances a given length of bar stock through the opened holding chuck. When the holding chuck closes, the collet automatically moves away from the holding chuck, said collet sliding over the surface of the bar stock. The collet is then in a position to move forward when the holding chuck opens, to again advance the stock through the holding chuck.

Heretofore it has been found in practice that when the pad or stock gripping member of the collet was not properly machined, or when the rod or bar stock had a plus or minus tolerance for a given size, the stock would either not go between the gripping surfaces of the pad, or if the bar stock did pass within the gripping surfaces, the pad would not have gripping tension to properly hold the stock and move it into the jaws of the holding chuck. My invention has an adjustment which will permit the operator to properly set the pad pressure for the particular bar stock in the machine.

On many jobs it is essential that the surface of the bar stock is not scratched in the slightest degree. The nicety of adjustment in my collet eliminates this undesirable feature.

In the drawing:—

Fig. 1 is a longitudinal vertical sectional view partly broken away, of the collet attached to the feed quill within the spindle.

Fig. 2 is an enlarged vertical sectional view more clearly showing my improved collet.

Fig. 3 is a side elevation of the connecting nipple.

Fig. 4 is a side elevation of the adjustment lock nut.

Fig. 5 is a side elevation of the collet stock gripping pad.

Fig. 6 shows a transverse section of the collet on plane indicated by 6—6 on Fig. 2.

Referring now to the drawing:

In Fig. 1 the operation of the feed quill 1 in relation to the holding chuck 2 attached to the spindle 3 is so well understood as to scarcely require reference thereto. Briefly, however, Fig. 1 shows a conventional type of sleeve or feed quill 1 having a collet 4 secured to one end, and a spool 5 affixed to the opposite end of said sleeve. The yoke 6 is slidably mounted on a bed or other means so as to permit reciprocation of the sleeve 1 within the chuck tube 7 and spindle 3. The camming spool 8 is reciprocated by any conventional means, forcing the wedge 9 between the camming levers 10 and 10', which actuate teeth 11 and 11', against the chuck tube shoulder 12. The moving forward of the chuck tube 7 causes the holding chuck 2 to securely grip the bar stock while the cutting or tool operations are in progress. When the holding chuck 2 grips the bar stock, the yoke 6 automatically moves rearwardly causing the collet 4 to slide over the surface of bar stock. The spindle 3 is held in bearings and may be revolved by any suitable means, such as a pulley.

Fig. 2 discloses the collet 4 threadedly connected to the feed quill by the nipple 15. The collet 4 is composed of a shell or cone 16, which houses a metallic pad 17, a lock nut 18, and a threaded end of the nipple 15. The pad 18 has lugs 19—19' which slidably engage the grooves 20—20' in the rear or threaded end of the cone 16. The cone 16 is made of spring steel and is substantially cylindrical within to provide a working surface for the cylindrical portion of the pad 17, the cone 16 having oppositely disposed longitudinal slots for substantially two thirds its length which provide resilient fingers for engagement of the shoulders 21—21' against the outer surface of the bullet nosed finger surfaces 22—22'. When it is desired to more firmly grip the stock 23, shown in dotted lines, it is necessary only to unloosen the lock nut 18 on the left-hand threaded nipple 15, turn the cone 16 the desired amount in the proper direction by use of a wrench on the flattened portions 24—24' of the cone 16, and tighten the lock nut 18 against the cone 16. While the resilient fingers of the cone 16 are substantially rigid, the forcing of the pad nose 22—22' against the shoulders 21—21' will cause the resilient fingers of the pad 17, which is of a softer metal, to move toward each other, thereby creating the desired pressure of stock gripping surfaces 13—13' upon the bar stock 23. It will be observed that the resilient fingers of the cone overlap the nose end of the pad, and place the pressure of the shoulders on the pad nose at the most desirable point of leverage.

The pad 17 has lugs 19—19' thereon, said pad being longitudinally slotted similar to the cone 16. The lugs on the pad slidably engage the grooves of the cone and hold the longitudinal slots of the cone and the pad in fixed axial alinement as shown in Fig. 2, to maintain the even pressure of the stock gripping surfaces upon the bar stock when the collet moves along the surface of said bar stock, by preventing the pad from revolving within the cone. While I have found the groove and lug arrangement advantageous, the collet may be made without employing this means, or may be substituted by other alignment means.

Modifications may be and may become obvious to those skilled in the art, and I do not desire, therefore, to limit my invention except by the scope of the subjoined claims.

Having thus described my invention, what I claim is new and desire to secure by Letters Patent of the United States, is—

1. A feed collet comprising a single stock engaging member having slots extending from one end thereof to form a plurality of resilient stock gripping fingers, a resilient fingered housing surrounding said stock engaging member, said stock gripping member and said housing being respectively externally and internally tapered at their slotted ends to provide cooperating wedging surfaces, and means for adjusting the longitudinal position of said stock engaging member relative to said housing to control the contact between said collet and stock being fed therethrough.

2. A feed collet comprising a single stock engaging member having slots extending from one end thereof to form a plurality of resilient stock gripping fingers, a resilient fingered housing surrounding said stock engaging member, said stock gripping member and said housing being respectively externally and internally tapered at their slotted ends to provide cooperating wedging surfaces, means comprising longitudinal internal slots in said housing and engaging radial external lugs on said stock engaging member for holding said members against relative rotation, and means for adjusting the longitudinal position of said stock engaging member relative to said housing to control the contact between said collet and stock being fed thereby.

PETER E. NOLAN.